United States Patent [19]

Boonstra

[11] 4,361,485
[45] Nov. 30, 1982

[54] METHOD OF AND APPARATUS FOR WASHING AND CLEANING MEMBRANE FILTRATION UNITS

[75] Inventor: Sije Boonstra, Zwolle, Netherlands
[73] Assignee: Wafilin B.V., Zwolle, Netherlands
[21] Appl. No.: 165,042
[22] Filed: Jul. 1, 1980

[30] Foreign Application Priority Data

Jul. 3, 1979 [NL] Netherlands .......................... 7905194

[51] Int. Cl.³ ........................ B01D 31/00; B01D 13/00
[52] U.S. Cl. .................................... 210/636; 210/652; 210/195.2; 210/409; 210/433.2
[58] Field of Search ..................... 210/791, 433.2, 409, 210/637, 636, 652, 195.2

[56] References Cited

U.S. PATENT DOCUMENTS

| 3,498,910 | 3/1970 | Mendelson ...................... 210/409 X |
| 3,819,513 | 6/1974 | Ishii, et al. ......................... 210/636 |
| 3,846,295 | 11/1974 | Gibbs .................................. 210/637 |
| 4,200,533 | 4/1980 | Gappis et al. ................ 210/433.2 X |

FOREIGN PATENT DOCUMENTS 7404265 9/1975 Netherlands ..................... 210/433.2

OTHER PUBLICATIONS

McCutchan et al., "Osmosis at Coalinge, Calif.," Presented at Annual Conf., San Diego 5-22-69, from JAWWA, pp. 347-353.

Primary Examiner—Frank A. Spear, Jr.
Attorney, Agent, or Firm—Wilkinson, Mawhinney & Theibault

[57] ABSTRACT

Method of and apparatus for washing and cleaning membranes of a plurality of membrane filtration units aligned in series, each unit being part of a circuit provided with a recirculation pump, each circuit being provided with an inlet and an outlet. Washing liquid is supplied to the circuits in an amount exceeding the predetermined capacity of the recirculation pump.

15 Claims, 1 Drawing Figure

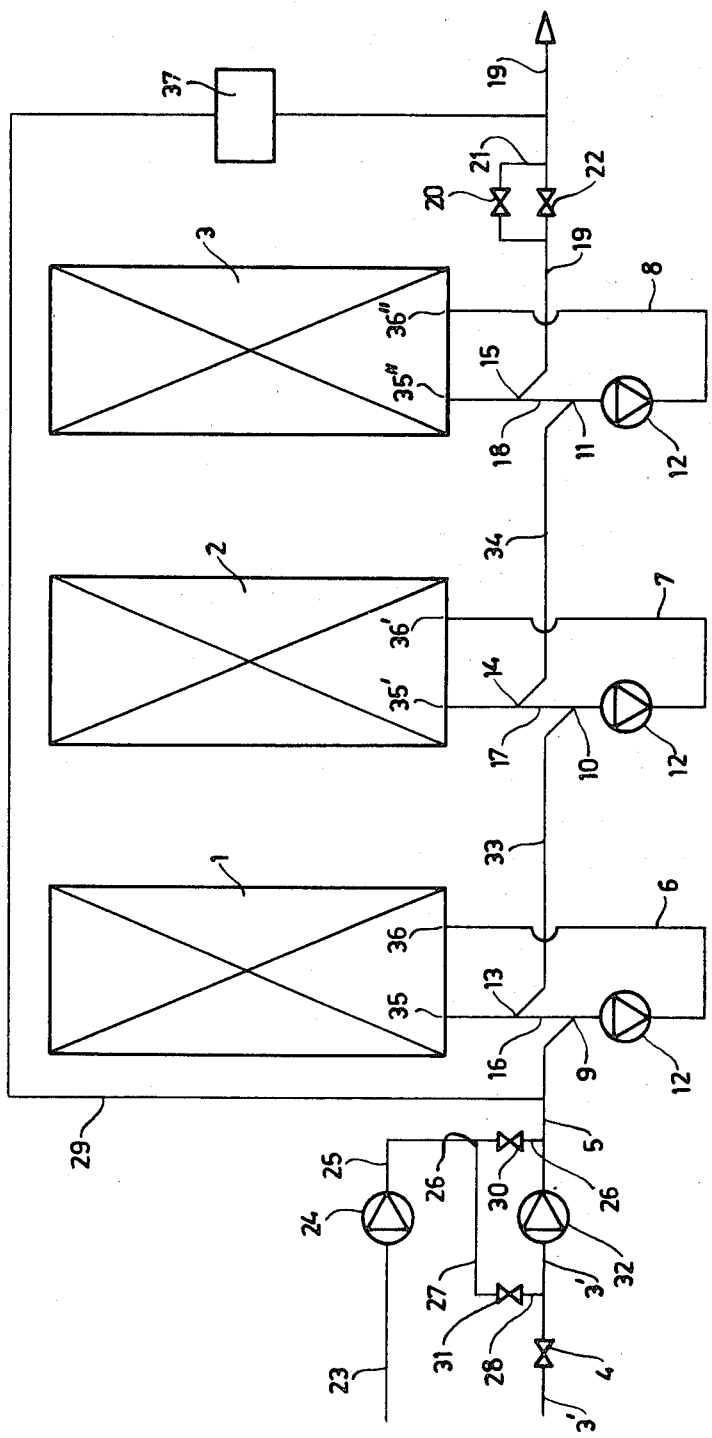

METHOD OF AND APPARATUS FOR WASHING AND CLEANING MEMBRANE FILTRATION UNITS

BACKGROUND OF THE INVENTION

1. Field of the Invention

The present invention relates to a method of washing and cleaning a plurality of membrane filtration units aligned in series, each of said units being part of a circuit provided with a recirculation pump, whereby the respective unit of each of the circuits can be fed with liquid to be purified and impure liquid be discharged, which either serves as a supply for a consecutive circuit or which is discharged by subsequently introducing a washing liquid whether or not containing washings bodies, through the respective membrane filtration units, aligned in series.

2. Description of the Prior Art

In the prior art a method for washing and cleaning a plurality of membrane filtration units aligned in series has been used. During the use of membrane filtration units, impurities will accumulate upon the membrane surfaces, which surfaces contacts liquids to be purified; the presence of said impurities may give rise to a decrease in the action of said membranes. In order to remove the impurities a constant washing and cleaning of the membranes in membrane filtration units is required.

Often said washing and cleaning is effected with a desinfectant in order to prevent microbiological growth in the membrane filtration units, the growth being due to high temperatures occurring during said membrane filtrations, so that growth of microbes will rapidly multiply, the respective growth likewise giving rise to a great number of other drawbacks.

The washing and cleaning effects may be improved in tubular membranes by including spherical bodies in the washing liquid, which bodies exert a mechanical cleaning action upon the membranes. In membrane units consisting of helically wound membrane modules, only washing liquid is used which may contain a desinfectant in a later stage.

The difficulty with this known method of washing and cleaning a plurality of membrane filtration units aligned in series, is that special measures have to be taken for separating the washing liquid for the various membrane filtration units aligned in series, so that special close-off valves have to be applied for introducing the washing liquid through various different consecutive membrane filtration units. Furthermore, the known method of washing and cleaning membrane filtration units demands much energy.

SUMMARY OF THE INVENTION

In view of the foregoing factors and conditions of the prior art it is a primary of the present invention to provide a method of and apparatus for washing and cleaning a plurality of membrane filtration units aligned in series not requiring special close-off valves.

This object is attained in accordance with the present invention in that a quantity of washing liquid is fed to the circuits, which quantity exceeds the predetermined pumping capacity of each recirculation pump.

When such a measure is applied, the recirculation pump will pump the washing liquid entirely through the respective membrane filtration unit without particular close-off valves having to be opened or closed in order to effect said washing liquid to the discharged after it has passed the respective membrane filtration unit.

This allows a very easy conversion from normal working conditions to the washing operation and from the washing operation to normal working conditions.

As the present installation now comprises less valves, the installation will be less expensive and less susceptible to interruptions; moreover, the control of fewer valves is effected more easily.

The amount of required washing liquid is also reduced, as the change to the washing operation can be effected more rapidly.

The flow velocity during washing is high, so that washing and cleaning can be performed in a short period of time, which involves less temperature decrease of the present installation at a reduced consumption of cleaning agents. The fact that the temperature of the present installation is substantially maintained is very important. Cleaning with enzymes containing washing liquids requires a very limited temperature range for an effective action of the enzymes.

In this respect it should be noted that a temperature decrease of the installation is avoided by the circuit recirulation pumps remaining in active condition and dissipating heat.

The washing and cleaning liquid is preferably fed to the circuit at a point located between the recirculation pump inlet and the outlet of the respective unit being connected with the circuit. The washing liquid is discharged from the circuit at a location situated between the washing liquid inlet and the outlet of the respective membrane filtration unit.

Due to this measure the recirculation pump will only pump washing and cleaning liquid through the membrane filtration unit, whilst said pump will redischarge the washing liquid from the circuit. After the liquid has passed the relative membrane filtration unit, the washing liquid cannot possibly be re-introduced into said recirculation pump. The excess washing liquid will actually cause part of the washing liquid to flow from the inlet toward the washing liquid outlet of the circuit. Due to these measures, on optimum cleaning of the membrane filtration units is obtained.

The present invention is also embodied in apparatus for washing and cleaning a plurality of membrane filtration units aligned in series, each of the units being accommodated in a circuit comprising a recirculation pump. Each circuit is provided with a circuit inlet for feeding a liquid to be purified into the respective units and a circuit outlet for the discharge of impure liquid from the respective unit circuit, which circuit outlet is connected with a consecutive circuit or with an apparatus outlet and a washing liquid inlet. The apparatus comprises a washing liquid inlet pump having a pumping capacity exceeding that of the predetermined pumping capacity of the unit recirculation pump of a circuit into which washing liquid is fed.

As far as in the foregoing the expression "membrane filtration units" is used, this expression is to be understood as units which are employed for ultrafiltration and units which are employed for reverse osmosis.

The features of the present invention which are believed to be novel are set forth with particularity in the appended claims.

Other features and many of their attendant advantages will be more readily appreciated as the same becomes more fully understood by reference to the following detailed description and considered in connection with the accompanying drawing in which like reference symbols designate like parts throughout the figures.

DESCRIPTION OF THE DRAWING

The present invention will be explained with respect to an embodiment in the drawing, which schematically shows an apparatus for performing the method in accordance with the present invention.

DESCRIPTION OF A PREFERRED EMBODIMENT

In order to better understand the present invention a description of a preferred embodiment is provided, accompanied by the drawing.

The drawing shows an apparatus comprising three membrane filtration units 1, 2 and 3 which are aligned in series. Each membrane filtration unit comprises a number of pressure supporting pipes known per se, the inner side of the pipes being provided with a non woven tube supporting on its inner side a filtration membrane. The filtration membrane may consist of cellulose acetate, but may also be of other macromolecular substances. It will be obvious, however, that instead of pressure supporting pipes, a helically wound membrane filtration unit may be accomodated in the membrane filtration units, each helically wound unit then serving for the purification of liquid to be purified.

The membrane filtration unit 1 is, via membrane filtration unit outlet 35, connected with a circuit 6, which circuit 6, discharges into membrane filtration unit inlet 36. As can be seen, the membrane filtration unit 2 is, via membrane filtration unit outlet 35', connected with circuit 7, which is connected in turn with the membrane filtration unit 2 via membrane filtration unit inlet 36'.

Finally membrane filtration unit 3 is, through outlet 35", connected with circuit 8, which discharges into membrane filtration unit inlet 36".

Each circuit 6, 7, 8 comprises a recirculation pump 12, which pumps liquids through the circuit and the respective membrane filtration unit connected therewith.

Circuit 6, connected with the first membrane filtration unit 1, is provided with a circuit inlet 9 and a circuit outlet 13. The circuit outlet 13 is located between the membrane filtration unit outlet 35, and the recirculation pump 12, whereas the circuit inlet 9 is situated between said circuit outlet 13 and the recirculation pump 12.

A continuous line part 16 is accomodated between the circuit inlet 9 and the circuit outlet 13, thus causing a closed circuit 6.

The circuit outlet 13 of the first circuit 6 is connected with the circuit outlet 10 of the second circuit 7, via line 33, said second circuit 7 being likewise provided with a second circuit outlet 14. The inlet 10 and the outlet 14 of the second circuit 7 are provide in a manner corresponding to that of circuit inlet 9 and circuit outlet 13 in the first circuit 6. The outlet 14 and the inlet 10 of the second circuit 7 are interconnected via line part 17.

Outlet 14 of the second circuit discharges, via line 34, into inlet 11 of the third circuit 8, which third circuit 8 is likewise provided with an outlet 15 being connected with an outlet line 19 in which a close-off valve 22 is accomodated. Outlet line 19 is connected with a line 21 debouching at either side of the close-off valve 22 into line 19. Said line 21 further comprises a close-off valve 20.

The inlet 11 and the outlet 15 of the third circuit 8 are interconnected via line part 18.

Inlet 9 of the first circuit 6 is connected with a main supply line 5, being connected in turn with a high pressure pump 32, which high pressure pump is connected in turn with a liquid supply line 3' for the supply of liquid to be purified. Line 3' has a close-off valve 4.

The apparatus further comprises a washing liquid inlet 23, adjoining a washing liquid inlet pump 24 in the form of a centrifugal pump 24 adjoins a line 25 discharging into a branch line 27, which, via line part 28, discharges into supply inlet line 3' in between said close-off valve 4 and the high pressure pump 32, whilst line 25 discharges into supply line 5 through line part 26 having a close-off valve 30.

In order to wash and clean the respective membrane filtration units, one proceeds as follows.

Centrifugal pump 24 for washing liquid is actuated when close-off valves 30 and 31 are closed, so that line 25 is filled with washing liquid. The washing liquid subsequently streams through branch line part 27 toward close-off valve 31, which valve 31 is opened by the relative pressure, whilst simultaneously liquid inlet valve 4 is closed. After having closed the liquid inlet valve 4, close-off valve 30 is opened, so that washing liquid supplied through line part 28 and line part 26, streams into inlet line 5. The quantity of washing liquid fed into circuit inlet 9 is so chosen, that the fed quantity of washing liquid exceeds the predetermined pumping capacity of the recirculating pump 12. Thus part of the washing liquid will move, through connection line 16, toward circuit outlet 13, whilst recirculation pump 12 will pump the incoming liquid through inlet 9, via the first membrane filtration unit 1. After having passed the membrane filtration unit 1 through outlet 35, the washing liquid will flow away through circuit outlet 13 of the first circuit 6 and will subsequently flow through line 33 into inlet 10 of the second circuit 7. As substantially no liquid can escape through the membranes, since a washing liquid having a relatively low pressure is used, inlet 10 is also fed with a quantity of washing liquid, which quantity exceeds the predetermined capacity of the recirculation pump 12. The recirculation pump 12 of the second circuit 7 also pumps the washing liquid through the second membrane filtration unit 2, and said washing liquid will escape via membrane filtration unit outlet 35' and circuit outlet 14 of the second circuit 7. Since inlet 10 is fed with a quantity of washing liquid, exceeding the pumping capacity of recirculation pump 12, washing liquid will also flow toward the outlet 14, through line 17. Consequently excess liquids will be expelled by washing liquid in a very convenient manner. Washing liquid discharged via outlet 14 of second circuit 7, flows through line 34, into inlet 11 of third circuit 8 and after having passed third membrane filtration unit 3, subsequently flows through outlet 15 of third circuit 8. The removal of washing liquid may easily take place by opening the close-off valves 20 and 22. As the quantity of washing liquid being introduced into inlet 11 of the third circuit 8, also exceeds the pumping capacity of recirculation pump 12 in third circuit 8, washing liquid will flow through connection line 18 toward outlet 15 of third circuit 8. The washing liquid escaping through outlet 15, will arrive in line 19.

During the washing and cleaning operation the high pressure pump 32 may exceed its action, as in the apparatus according to the present invention, high pressure cannot possibly be exerted, due to close-off valves 20 and 22 being opened.

It goes without saying that the high pressure pump 32 may be stopped during a further washing operation.

It is generally recommended to choose the quantity of washing liquid to be fed into inlets 9, 10 or 11, that approximately 5 to 10% of the fed quantity of washing liquid will flow toward outlet 13, 14, 15 respectively, via connection lines 16, 17, 18 respectively. The remaining washing liquid is pumped through the consecutive membrane filtration units 1, 2 and 3 by the recirculation pumps 12.

The washing liquid is fed by means of, for example, a centrifugal pump exerting a pressure of e.g. 3 atm., said centrifugal pump, which is operable during the membrane filtration, being able to exert pressures in the system of e.g. 38 atm. The latter is, naturally, dependent upon opening or closing the close-off valves 20, 22 respectively.

After having washed and cleaned the entire installation, the close-off valves 30 and 31 are closed and liquid inlet 4 is re-opened whilst close-off valve 22 in outlet line 19 is also closed. Since less washing liquid may escape through close-off valve 20 than through both close-off valves 20 and 22 together, said washing liquid will be subjected to a high pressure, when high pressure pump 32 is operating. The fed liquid to be purified is streaming through line 3' and arrives via line 5 into inlet 9 of the first circuit 6, whereafter said liquid is circulated by the recirculation pump. During said circulating pumping permeate passes the membranes, whereafter more impure liquid escapes via line 33 toward second circuit 7 and after having passed the second membrane filtration unit 2, still more impure liquid will stream into third circuit 8, via line 34.

It will be obvious that instead of three membrane filtration units, a greater or smaller number may be employed.

The pumping capacity of the recirculation pumps 12 is e.g. 123 cm3/h, whilst the capacity of the centrifugal pump 24 is 130 m3/h.

The high pressure pump 32 has, e.g. a capacity, ranging from 23 to 40 m3/h and is able to increase the pressure of liquid to be purified, from 15 to 38 atm.

From the foregoing it appears that by feeding a suitable quantity of washing liquid to inlet 9, no special close-off valves need be accomodated in connection lines 16, 17 and 18, as the excess liquid, which is not pumped away by recirculation pump 12, will automatically arrive in outlets 13, 14, 15 respectively, via connection lines 16, 17 and 18.

In case the membranes should also be subjected to a cleaning action with mechanical means, like, for example, plastic spheres, said cleaning bodies may be fed through line 29, and after having passed the entire installation said bodies may be recovered in a cleaning body storage vessel 37 and, starting again from said vessel 37, be reintroduced into line 7.

If desired, a chemical cleaning agent or a desinfectant may be added to the washing liquid.

For completeness' sake it is observed that, when 130 m3/h of liquid is fed to the first circuit 6, the same quantity may be fed to the second and third circuit 2, 3 respectively. The recirculation pumps 12 in each circuit have a pumping capacity of 123 m3/h.

As washing with washing liquid is performed at low pressure, a back flush effect is observed involving a loosening of the layer of impurities on the membranes, while on the other hand a better removal of said impurities is effected.

In the preceding description on additional washing liquid inlet pump 24 is used for supplying an amount of washing liquid to the circuit which amount is greater than the amount of liquid pumped by circuit recirculation pump 12 under normal working conditions.

However, it is also possible to obtain the desired effect by decreasing the capacity of the circuit recirculation pump 12, until said capacity is lower than the capacity of the high pressure pump 32. For obtaining a decreased pressure during the cleaning operation with washing liquid, valves 20 and 22 in end outlet 19 have to be opened wider.

As in the present invention the washing operation takes place at a low pressure and with a high flow velocity, said washing is very effective, so that a smaller number of washing operations per cay are necessary.

Due to the short washing time there is a higher tendency to perform an intermediate washing, the more so as the washing can be performed in about 180 seconds (2×90 seconds).

What is claimed is:

1. Method of washing and cleaning a plurality of membrane filtration units (1,2,3) aligned in series, each of said units (1,2,3) being part of a circuit (6,7,8) provided with a recirculation pump (12), said circuits being valvelessly directly interconnected (9,10,11) in seriation whereby the respective unit of each of the circuits can be fed with liquid to be purified and impure liquid be discharged, which either serves as supply for a consecutive circuit or which is discharged, and by subsequently passing a washing liquid, through membrane filtration units aligned in series, at low pressure wherein a quantity of washing liquid is fed to the circuit inlet (9,10,11) which quantity exceeds the predetermined pumping capacity of the recirculation pump (12).

2. Method of washing and cleaning a plurality of membrane filtration units, aligned in series, according to claim 1, wherein the washing and cleaning liquid is fed to the circuits at a point (9,10,11) located between the recirculation pump (12) inlet and the outlet (13,14,15) of the respective membrane filtration unit, connected with the circuits (6,7,8).

3. Method of washing and cleaning a plurality of membrane filtration units, aligned in series, according to claim 1, wherein washing liquid is expelled from the circuits at a location (13,14,15) situated between the washing liquid inlet (9,10,11) and the outlet (35,35',35") of the respective membrane filtration unit (1,2,3).

4. Method of washing and cleaning a plurality of membrane filtration units, aligned in series, according to claim 1, wherein the flow opening of the end outlet (19) is increased during the washing and cleaning operation.

5. Method of washing and cleaning a plurality of membrane filtration units, aligned in series, according to claim 1, wherein the washing liquid is fed to the first circuit by means of a washing liquid supply pump (24).

6. Method of washing and cleaning a plurality of membrane filtration units, aligned in series, according to claim 1, wherein the washing liquid at least partially passes a highs pressure feeding pump (32).

7. Method of washing and cleaning a plurality of membrane filtration units, aligned in series, according to claim 1, wherein approximately 5 to 10% more washing liquid is fed into the inlet (9,10,11) of a circuit, than the capacity of the recirculation pump (12) allows.

8. Method of washing and cleaning a plurality of membrane filtration units, aligned in series, according to claim 1, wherein, during the washing and cleaning operation, an open connection (29) is maintained between the inlet of a circuit and the outlet of the last circuit.

9. Method of washing and cleaning a plurality of membrane filtration units, aligned in series, according to claim 1, wherein the output of the recirculation pump (12) is decreased below the output of the high pressure pump (32).

10. Apparatus for washing and cleaning a plurality of membrane filtration units, aligned in series, each of said units being accommodated in a circuit (6,7,8) comprising a recirculation pump (12), each circuit (6,7,8) being provided with a circuit inlet (9,10,11) for feeding a liquid to be purified into the respective units and a circuit outlet (13,14,15) for the discharge of impure liquid from the circuit, which circuit outlet (13,14,15) is valvelessly directly connected with a consecutive circuit or with an apparatus outlet (19) and a washing liquid inlet (5) the apparatus comprising a washing liquid supply pump (24,32) wherein (the apparatus comprises a) said washing liquid inlet pump (24,32) having a pumping capacity exceeding that of the predetermined pumping capacity of the recirculation pump (12) of a circuit into which washing liquid is fed.

11. Apparatus for washing and cleaning a plurality of membrane filtration units aligned in series, according to claim 10, wherein the circuits comprise washing liquid inlets (9,10,11) accommodated at a point between the inlet of recirculation pump (12) and the outlet (13,14,15) of a relative membrane filtration unit.

12. Apparatus for washing and cleaning a plurality of membrane filtration units aligned in series, according to claim 10, wherein the washing liquid outlets (13,14,15) for discharging washing liquid from the respective circuit are situated at a location between the washing liquid inlets (9,10,11) and the outlets (34, 35', 35'') of the respective membrane filtration unit.

13. Apparatus for washing and cleaning a plurality of membrane filtration units, aligned in series, according to claim 10, wherein the end outlet line (19) is provided with two close-off valves (20,22) for decreasing pressure in the circuits during cleaning.

14. Apparatus for washing and cleaning a plurality of membrane filtration units, aligned in series, according to claim 10, wherein the washing liquid inlet line (25) is provided with a branch line (27) which debouches into an inlet line (3') via a line (28) comprising a close-off valve (4), the washing liquid inlet line debouching via a line part, also comprising a close-off valve (30) into a line, being connected with the outlet (5) of a high pressure pump (32).

15. Apparatus for washing and cleaning a plurality of membrane filtration units, aligned in series, according to claim 10, wherein the close-off valve (31), located in the line into which the branch line (27) debouches, so cooperates with the close-off valve (4) located in the inlet line (3'), that after having fully opened said first close-off valve (28), the latter close-off valve (4) is entirely closed.

\* \* \* \* \*